United States Patent [19]
Bretten et al.

[11] 3,823,815
[45] July 16, 1974

[54] APPARATUS FOR MARSHALLING ELONGATED ARTICLES

[76] Inventors: David Charles Bretten; Peter Charles Chown, both of Bridge Works, St. Germans, Kings Lynn, Norfolk, England

[22] Filed: June 2, 1971

[21] Appl. No.: 149,298

[52] U.S. Cl............................................. 198/33 R
[51] Int. Cl............................................. B65g 47/24
[58] Field of Search..... 198/33 AA, 166, 165, 33 R, 198/59, 106, 220 BA; 221/165

[56] References Cited
UNITED STATES PATENTS

| | | | |
|---|---|---|---|
| 3,083,811 | 4/1963 | Musschoot | 198/220 A X |
| 3,113,574 | 12/1963 | Greedy et al. | 198/33 AA X |
| 3,462,001 | 8/1969 | Boyce | 198/33 AA |
| 3,517,797 | 6/1970 | Daleffe et al. | 198/33 AA |
| 3,623,593 | 11/1971 | VanMolle | 198/33 AA |

Primary Examiner—Evon C. Blunk
Assistant Examiner—Douglas D. Watts
Attorney, Agent, or Firm—Emory L. Groff; Emory L. Groff, Jr.

[57] ABSTRACT

Marshalling apparatus for delivering, from a bulk supply, tapered vegetables and generally similarly shaped articles in single file with their larger ends leading includes a carrier comprising two elongated members diverging in the direction of delivery, and a lower retarder to engage the lower smaller ends of the articles supported, with the larger ends uppermost, by and between the elongated members, to turn the articles into the required alignment. An elevator feeds the articles from a hopper to a multi-level multi-unit form of the apparatus, each unit comprising a vibratory tapered trough to marshal and feed the articles in single file to the carrier, and a similar trough may receive the articles from the carrier to present them to automatically actuated means for processing their larger ends.

2 Claims, 12 Drawing Figures

APPARATUS FOR MARSHALLING ELONGATED ARTICLES

This invention concerns apparatus for marshalling generally elongated articles, especially elongated articles of shapes which are characteristically larger towards one end than at the other end. By marshalling elongated articles is meant operating upon the articles, which are fed automatically from a bulk supply of the randomly arranged articles, in such a manner that they will be delivered to a receiving station in single file with their longer dimensions aligned in the direction of delivery. An object of the invention is to provide apparatus whereby the articles will be so delivered with their larger ends leading.

Although the improved apparatus is applicable for operating upon almost any articles of generally elongated form with one end larger than the other, it has been developed for operating upon vegetables which at some stage in processing require to be marshalled before being presented to a processing station. For example, sticks of celery, after the bulk of the foliage has been trimmed away, are elongated articles which are characteristically biggest at the root ends; the improved apparatus will deliver such sticks of celery with their root ends leading. Another example of an elongated vegetable with one end bigger than the other is a corn cob; corn cobs also are vegetables adapted to be operated upon by the improved apparatus.

Other articles which are particularly adapted to be operated upon by the apparatus of the invention are tapered root vegetables, for instance carrots and parsnips. In preparation for canning, tapered root vegetables, having had the major portion of their foliage trimmed away, present at their larger ends formations referred to as crowns. The crown comprises the remnants of the stems of the foliage springing from the centre of the larger end. These vegetables required to be topped; that is each crown has to be removed by slicing through a vegetable, at right angles to its length, near the extremity of its larger end. By the improved apparatus, such vegetables can be automatically fed from a hopper containing a bulk supply of the vegetables in random arrangement and delivered, one at a time in single file with their crowns leading, to a topping station.

In accordance with a further aspect of the invention, there is provided means for automatically topping or similarly operating upon the larger ends of elongated vegetables delivered thereto.

In accordance with the invention, marshalling apparatus for delivering elongated articles each being larger towards one end than at the other end, aligned in single file with their larger ends leading, comprises a carrier formed by two elongated driving members adapted to be driven longitudinally in the same sense and arranged side-by-side and spaced apart by a distance which increases in the driving direction from a receiving end to a delivery end, a retarding member extending below the carrier to engage the lower smaller ends of articles supported by and between the driving members with their larger ends generally uppermost, means for feeding on to the receiving end articles aligned in single file with their axes aligned in the delivery direction, and the carrier being adapted to release the articles, at the delivery end, with their larger ends leading.

The operation of the apparatus is briefly as follows. As received at the receiving end of the carrier, some of the articles will be aligned with their larger ends leading and others with their larger ends trailing. As the articles are carried along, due to the progressive increase of the distance between the driving members, each article will turn to an upright position in which it is supported with the extremity of its larger end above the driving members and the extremity of its smaller end depending below those members. As the distance between the driving members continues to increase, the extremity of the lower smaller end of the article will engage and be retarded by the retarding member, so that the article will be turned towards the condition in which the larger end is leading and in which condition it will be released at the delivery end of the carrier. Thus, whether or not an article is received at the receiving end with its larger end leading, it will be released with its larger end leading at the delivery end.

The feeding means may include a longitudinally vibratory trough tapering from a receiving end thereof to a delivery end thereof, for receiving articles in random arrangement at its receiving end and for delivering them aligned in single file at its delivery end.

The retarding member may be part of a longitudinally vibratory trough adapted to receive articles from the delivery end of the carrier and to feed them to a further longitudinally extending carrier.

In accordance with another aspect of the invention, a multi-unit machine comprises a group of sets each comprising an apparatus as above described, the sets being arranged side-by-side in substantially horizontal array, and a single uni-directional elevator for raising articles from a hopper and discharging articles to all the means for feeding to the receiving end of the carrier.

In accordance with another aspect of the invention, a multi-level machine comprises two or more groups of sets, each set comprising an apparatus as above described, the sets of a group being arranged side-by-side in substantially horizontal array, and the groups being mounted one above another, a single uni-directional elevator for raising articles from a hopper and discharging articles to the means for feeding to the receiving ends of the carriers, and the elevator having means for discharging articles from an upper end thereof to the upper group and selectively from a lower position or lower positions to the lower group or groups.

The elevator preferably comprises a table inclined upwardly from a hopper, an endlesss chain-driven conveyor extending between upper and lower sprocket-pulley systems and comprising spaced horizontal slats extending between two endless driving chains so as to be movable successively upwards through the hopper and across the top face of the table and thereafter downwardly under the table, to the hopper, whereby a batch of articles drawn upwards on the table by one of the slats will be discharged by falling as the slat rises above the top of the table.

For feeding the lower group or each of the lower groups of a multi-level machine, part of the table is formed with an aperture therethrough at an intermediate height, a shutter movable between a position wherein it closes the aperture and is substantially coplanar with the table and a position in which the aperture is open, the aperture opening being less than the spacing of the slats, is biased into either its closed or open position and is engaged by actuating means for displacing it into the open or closed position respectively, and the shutter actuating means is automatically controllable from the elevator drive to permit selected batches conveyed by the slats to be discharged through said aperture.

Preferably the shutter will be biased closed.

The shutter actuating means may be a double acting reciprocable driving member, for instance a hydraulic or pneumatic cylinder and plunger, controllable by a cam driven synchronously with the chain drive.

In accordance with another aspect of the invention there is provided at a receiving station apparatus for topping elongated vegetables delivered to the receiving station by the improved marshalling apparatus, the topping apparatus comprising a blade extending in a plane transversely to the direction of delivery to the station, means for detecting the delivery at the receiving station of a vegetable with its leading end in a position for engagement with the blade and driving means responsive to the detecting means for effecting relative movement between the so delivered vegetable and the blade in the sense to cause the blade to top the vegetable.

The invention is further described with reference by way of example to embodiments illustrated diagrammatically in the accompanying drawings wherein.

Figure 1:
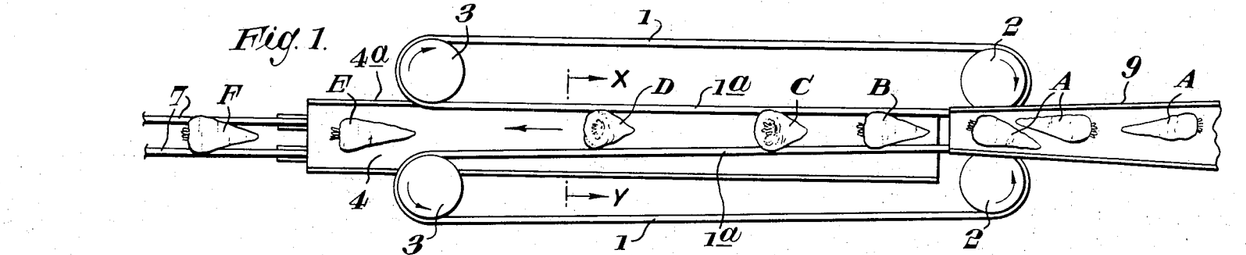
FIG. 1 is a plan of part of marshalling apparatus.
Figures 2, 3:
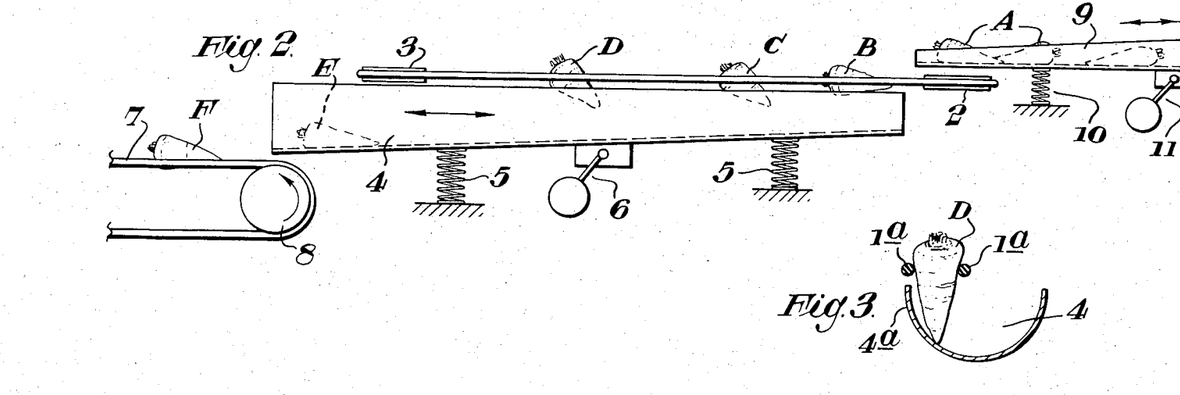
FIG. 2 is a side elevation of the structure shown in FIG. 1.
FIG. 3 is a fragmentary section on the line X-Y in FIG. 1.

Referring first to FIGS. 1-3, a carrier comprises two endless belts or wires or similar longitudinally extending members 1,1 arranged side-by-side in the same horizontal plane, each extending taut between a pulley 2 at a receiving end and a pulley 3 at a delivery end, the pulley axes being vertical, and the pulley pairs 2,2 and 3,3 are so located that the adjacent inner runs 1a,1a of the belts are divergent towards the delivery end, i.e. the distance between them increases towards the delivery end at the left hand in FIGS. 1 and 2. The pulleys are so driven that the inner runs 1a, 1a, move in the same sense, at speeds which may be equal or may be different from one another, towards the delivery end.

A trough 4, to serve as a retarding member extends below the carrier 1,1. The trough 4 is shown as being of generally semi-circular cross section, but the section shape may be V-form, or semi-elliptical, or any other shape having as seen in section a straight or curved surface which will serve as a retarding means as described below.

As indicated in FIG. 3, the trough 4 is so located that the upper edge of one side 4a thereof is aligned below one inner belt run 1a with the other belt run 1a extending above the centre of the trough 4. The trough 4 extends from the receiving end of the carrier to beyond its delivery end, and its depth progressively increases to the delivery end.

The trough 4 is resiliently mounted, as indicated by springs 5,5 in FIG. 2, and is engaged by a vibrator 6, for instance a weight driven in rotation about an axis which is transverse to the feeding direction, to vibrate the trough 4 generally in that direction so that any articles within the trough will be caused to advance therein and to be discharged at the delivery end.

A final carrier, extending away from the first carrier in the feeding direction, comprises parallel horizontal spaced upper runs 7,7 of two endless wires, positioned with its receiving end over-lapped by the delivery end of the trough 4. The wires comprising the final carrier extend about pulleys 8 at its receiving end and about other pulleys, such as pulleys 51,52 in the hereinafter described FIG. 9, one or more of which being driven to move the upper runs 7,7 in the delivery direction away from the trough 4.

The receiving end of the first carrier 1a,1a is over-lapped by a forward narrower end of a tapering feeder trough 9 which is resiliently mounted, as indicated by the spring 10 in FIG. 2, and is acted upon by a vibrator 11, similar to the vibrator 6 for the trough 4, whereby the feeder trough 9 is vibrated to discharge to the first carrier 1a,1a.

Figures 4, 7, 8:
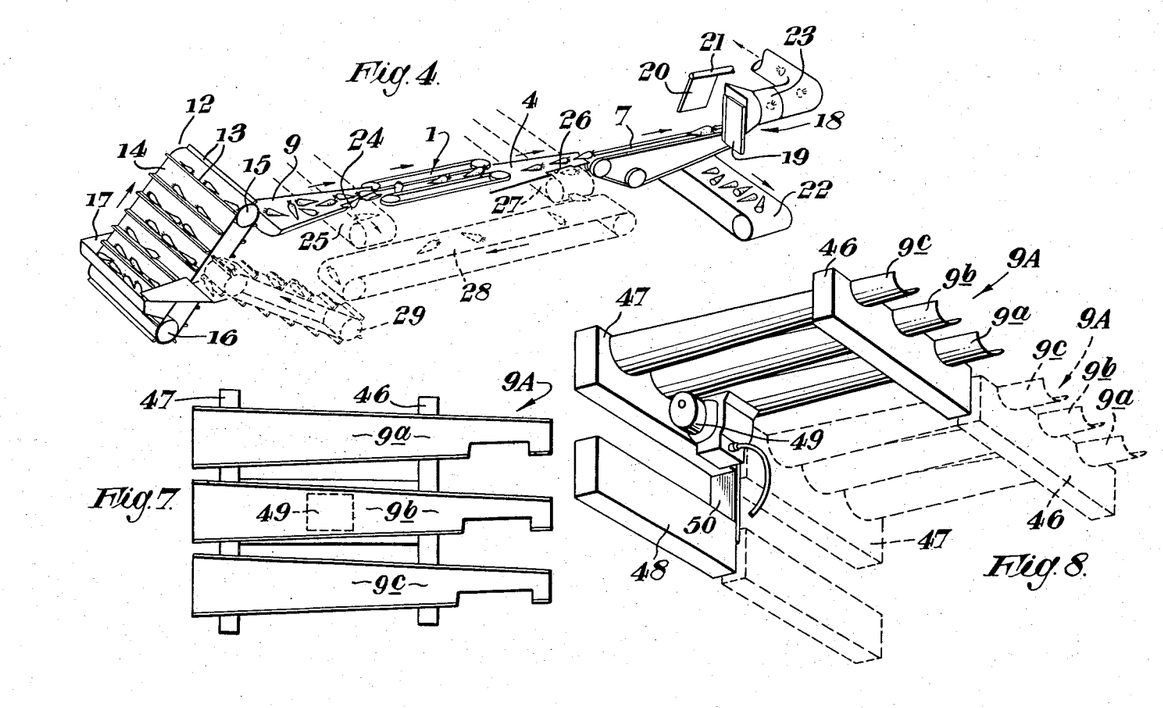
FIG. 4 represents a complete machine for feeding vegetables, particularly carrots, to a topping device.
FIG. 7 represents an element of one level of a multi-level apparatus, in plan.
FIG. 8 is a view from below, in perspective, of the element shown in FIG. 7.

Referring next to FIG. 4, a feeding elevator 12 comprises a number of spaced longitudinal ledges or slats 13 on the outside of a wide endless band 14 stretched between upper and lower rollers 15,16 respectively. The elevator is inclined upwardly to a position above the receiving end of the feeder trough 9. The upper upwardly moving run of the elevator 12 moves through a bottom hopper 17 which can be charged in any convenient manner with carrots in bulk. As the elevator operates, it raises carrots on the ledges 13 and as each ledge 13 moves over the top of the elevator the carrots carried by it fall to the receiving end of the feeder trough 9. The tapering shape and manner of vibration of the trough causes the carrots to move progressively to its delivery end and at the same time to become so marshalled that, at the delivery end they are aligned with their longitudinal axes extending generally in the conveying direction and they are discharged, one at a time and so aligned, to the carrier 1.

Referring again to FIGS. 1-3, the carrots discharged from the feeder trough 9 will be randomly arranged as at A, some with the crowns leading and others with the crowns trailing, and will be so received by the carrier 1. Each carrot is then progressed through stages B,C,D on the carrier 1. As the carrier members 1a,1a diverge, a carrot tends to move downwardly between them so that its smaller end, or tail, depends below the members 1a,1a. That action occurs whether the crown is initially leading or trailing. Eventually the depending tail of a carrot (D) will engage the bottom or the side wall 4a of the first mentioned trough 4, as indicated in FIG. 3, so that the forward movement of the tail will be retarded in relation to the forward movement of the crown effected by the carrier members 1a,1a. Thus the carrot will tend to be turned with its crown leading, and when it is finally released by the carrier members 1a,1a to fall to the bottom of the trough 4, as indicated in FIGS. 1 and 2, at E, it will be aligned in the required direction with its crown leading.

The vibration of the trough 4 causes it to convey the so aligned carrots and to discharge them one at a time from its smaller forward end to the final conveyor 7 on which each carrot is still arranged with its crown leading, as indicated at F in FIGS. 1 and 2.

Each carrot is delivered in turn to a topping station where, as shown in FIG. 4, a flat cutter blade 19 is mounted vertically adjacent to one side of the conveyor, the plane of the blade 19 being transverse to the conveying direction and the vertical edge of the blade being directed towards the conveyor. Above the delivery end of the conveyor 7 a sweeper blade 20 depends from and is fast with a spindle 21 extending horizontally and centrally above the conveyor 7. The sweeper blade 20 can be swung across the conveyor 7 over the front of the cutter blade 19; in that movement the blade will engage the main body of the carrot behind its crown, displacing the carrot sideways off the conveyor and forcing it against the cutter blade 19 so that the carrot is topped, i.e., the crown is severed from the main body of the carrot. The main body falls to a belt conveyor 22 whereby it can be delivered to an appropriate collecting station. The crown is carried away by a suction duct 23 and can be discharged to waste by a paddle bladed suction fan.

At its delivery end, one side of the feeder trough 9 preferably has a cut-away portion providing a side opening 24 through which, in the event of two carrots becoming positioned one on top of the other in this position, the top one will fall away through the side opening 24 to a lower transverse belt conveyor 25. The retarder trough 4 preferably also has a similar side opening 26 at its delivery end, through which carrots can fall to another transverse belt conveyor 27. Both conveyors 25,27 discharge to a return conveyor 28 which in turn discharges to an auxiliary elevating belt conveyor 29 which discharges at its upper end to a chute 30 leading to the hopper 16.

The arrangement illustrated in FIG. 4 can be extended to a number of sets of the apparatus arranged side-by-side and all fed by the same main elevator 12. In such an arrangement the same final conveyor 22 can extend under all the sets to receive the topped carrots therefrom. Similarly the two conveyors 25,27 leading to the return conveyor 28 will receive carrots falling through the side openings 24, 26 of the troughs of all the sets.

Any under-sized carrots and also any small debris, which is fed to the first carrier 1 by a feeder trough 9 will immediately fall though the gap between the inner runs 1a,1a. It is convenient to set the receiving end of the retarding trough 4 slightly downstream of the receiving end of the first carrier 1, so that such small carrots and debris will fall clear of the trough 9.

A further transverse trash conveyor, not shown, may be provided to receive the small carrots and debris. In one arrangement, the trash conveyor may be combined with the transverse conveyor 25. In such a combination, the conveyor 25 is widened and runs below a fixed partition so that carrots to be returned to the hopper 17 are carried at one side of the partition and the trash is carried at the other side thereof. Short of the position of discharge to the return conveyor 28, the end of the partition is turned across the trash conveying path of the widened conveyor, to deflect the trash to a convenient receiver, thus preventing the trash being returned to the hopper.

In addition to providing a number of sets of the apparatus at the same level, as a single-level multi-unit machine, there may be provided such a multi-unit arrangement at more than one level, i.e., a multi-level multi-unit machine, also fed by one main elevator.

Figures 5, 6:
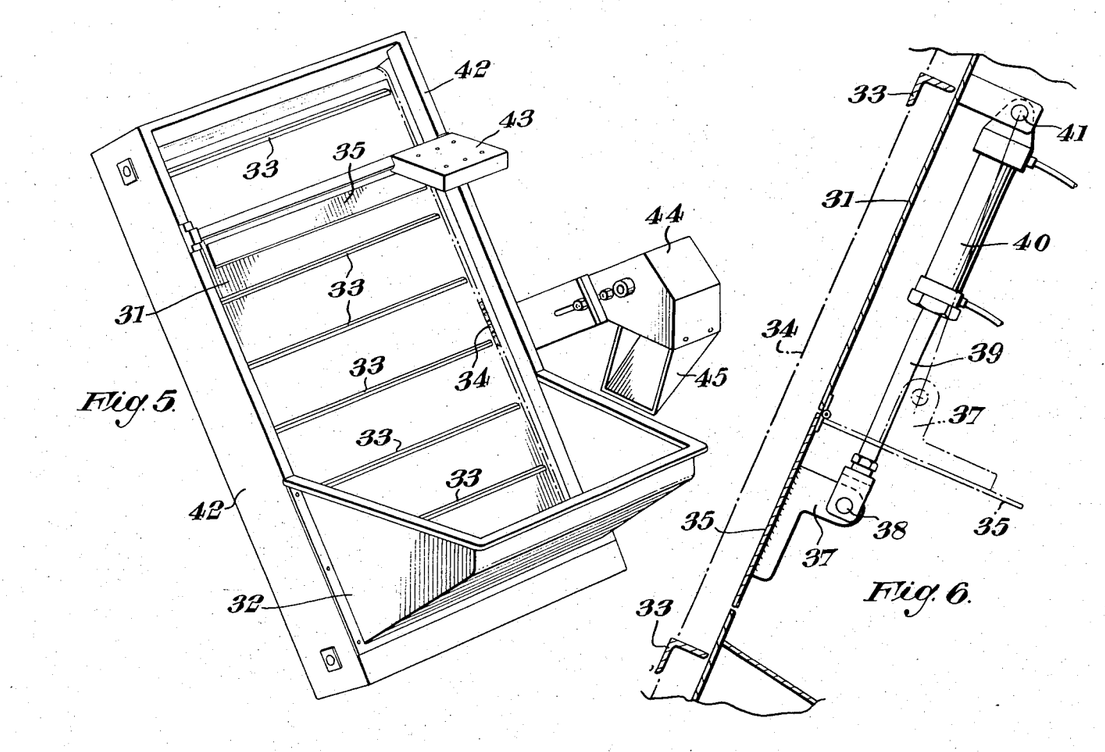
FIG. 5 represents a main elevator for feeding a two-level multi-unit apparatus.
FIG. 6 represents part of a mechanism for controlling the discharge from the elevator, of FIG. 5, to the lower level.

Such a machine requires a special design of the main elevator, as described for use with a two-level machine with reference to FIGS. 5 and 6.

In those Figures the main elevator comprises an inclined table 31 extending upwards from a lower hopper 32 and inclined forwardly, that is towards the output end of the machine. The conveyor of the elevator comprises horizontal uniformly spaced slats 33 fastened at their ends to endless chains, of which part of one chain 34 is shown in FIG. 5, extending round driving sprockets at the top of the elevator and free running sprockets at the bottom of the elevator. At an intermediate height, the table 31 is interrupted by a horizontal slot extending substantially completely across the table 31 and of width about half the distance between adjacent slats 33,33. A flap 35 fits in the slot, being hinged at its upper boundary 36 and adapted to be turned between a closed position, shown in full line in FIG. 6, in which it is coplanar with the table 31, and an open position rearwardly of the table, as shown in broken line in the Figure, to open the slot. A projection 37 on the back of the flap 35 has a pivotal coupling 38 with the lower end of a plunger 39 of a double-acting hydraulic cylinder 40 which has pivotal coupling 41 with the table 31 or a main elevator frame 42. A two-state valve, not shown, controls the supply of pressure fluid to the cylinder 40 to provide in one state, into which the valve is biased, that the plunger 39 is extended to close the flap 35, and in the other state that the plunger is retracted to open the slot. The two-state valve is conveniently operable by a cam driven by or in synchronism with the chain sprockets, so that the valve will act to successively open and close the slot once in each revolution of the sprockets.

As each slat 33 rises from the hopper 32, it draws a batch of carrots upwards on the table 31. When the flap is closed, a batch carried across it by a slat 33 will be raised to the top of the table 31 and discharged beyond its upper boundary over a curved extension 33a, to fall behind the elevator. When the slot is open, due to the flap 35 having been lifted, a batch raised to it by a slat 33 will be discharged through the slot to fall behind the elevator. The relation between the spacing of the slats 33,33 the dimensions of the chain sprockets, and the setting of the cam controlling the hydraulic cylinder 40, can be such that batches raised by alternate slats, that is half the elevator delivery, will be discharged through the slot, so that the elevated delivery will be equally divided between the upper level and the lower level.

In FIG. 5 is shown, on one side 42 of the elevator frame, a platform bracket 43 on which a driving motor can be mounted. Also in that Figure is shown a housing 44 for the upper end of the elevator from the return conveyor (28), and the return chute 45 to the hopper 32.

A typical multi-unit array comprises six units arranged side-by-side in the or each level. Referring to FIGS. 7 and 8, it is convenient to arrange the feeder troughs as two groups 9A,9A each of three troughs 9a–9c, held together as a unit by two transverse beams 46,47, one at the back and the other towards the front, the troughs being located in recesses in the tops of the beams. The unit is conveniently carried by front and rear rubber feet to comprise the aforementioned resilient mountings. The two such units are supported on a frame extending under both units, the rubber feet resting on the frame. In FIG. 8 is shown one frame member 48 extending under two aligned beams 47,47 of the units. It is also convenient to provide that the frame can be tilted about one end to alter the angle of inclination of the feeder troughs of the units simultaneously.

The vibration of the three troughs 9a–9c of each group 9A is provided by a motor driven eccentric weight 49 on the underside of the middle trough 9b of the group, the axis of rotation being horizontal and transverse to the feeding direction. Also the rotor is driven in the sense to provide that it moves in the feeding direction at the top of its eccentric path of movement.

The rate of feeding by the feeder troughs is simply and most effectively controllable by adjusting the angle of inclination. It is found that the device can be so adjusted that, whereas an effective feed rate for the carrots is obtainable, small items of soil and other debris falling on to the receiving ends of the feeder troughs will move in the reverse sense towards the adjacent wider ends of the troughs. If the troughs are open at this end, that effect may be made use of to discharge such debris to an appropriate trash receiver. If however the troughs are closed at their widest ends, they will be adjusted to feed the whole of their content forwardly, the debris being separated from the acceptable carrots at the receiving ends of the conveyors 1,1 in the manner described above.

In a two-level machine, the feeder troughs of both levels will be mounted as described with referecne to FIGS. 7 and 8. In order to facilitate the adjustment of their angle of inclination, the unitary structures of both levels can be coupled together by a tie-bar 50 (FIG. 8).

Where the main elevator, as described with reference to FIGS. 5 and 6, discharges batches to several sets of the apparatus at the same level, it is convenient to provide the following means for distributing the batches between the several feeder troughs.

A receiver channel, extending across the full width of the elevator, is divided by vertical webs into compartments corresponding in number to the number of sets in the level, i.e. six in the above described arrangement. In each compartment a forwardly inclined guide serves to direct the falling carrots, in the feeding direction, against a baffle which causes them to fall to the bottom of the compartment. From the compartment the carrots are released under a flap-like lower extension of the baffle. The extension may be of rubber or other flexible material, being a fixture at its upper end and displaceable outwardly to allow the carrots to pass under it to the receiving end of the adjacent feeder trough. This arrangement regulates the flow of carrots to prevent over-feeding to the feeder trough. The arrangements for controlling the feeding of carrots discharged from the elevator can be provided at the top and any intermediate discharge position.

The retarding troughs 4 of a two-level multi-unit machine can be mounted and associated with vibrating means in the same manner as above described for the feeder troughs.

When several troughs are grouped together and adapted to be vibrated as a unit, it is found that there may be a tendency for feed rate not to be the same in each of the side-by-side troughs. The feed rate in the central trough of an array tends to be different from that in the side troughs. This appears to result from small variations of amplitude of vibration across the width of the array. The condition can be counteracted by forming each of the transverse supporting beams 46,47 as a reinforced symmetrical inverted double-triangular structure with its major vertical dimension in the centre. The regulating effect of the structure can be considered in terms of its stiffness to resist bending, which stiffness will be a maximum in the centre, or in terms of the vibration-transmitting paths circulating in opposite sense in the two halves of the beam.

It is anticipated that a machine may comprise more than two levels of units, and the number of units in each level may be more or less than six. The elevator table 31 would be provided with a number of slots, each controlled by its flap 35, corresponding to one less than the number of levels in the machine. Each flap 35 will be controlled by means such as described with reference to FIGS. 5 and 6, with appropriate modifications to the valve-controlling cam or cams to provide selective control of the flaps, so that in a machine of N levels there will be an average of 1/Nth of the total elevator delivery discharged through each slot.

The final carrier 7,7 will usually be horizontal, as indicated in FIGS. 2 and 4, but it may be inclined or guided to be in part horizontal and in part inclined. The elements of the carrier will usually be driven at the same speed, but it is anticipated that the speeds may be different to impart a rolling action to the carrots, which may be of advantage.

In the topping device briefly described above with reference to FIG. 4, there is provided a single blade 19 and the sweeper device 20 can be driven to rotate, with the spindle 21, in the sense to force a carrot against the blade 19 as the sweeper blade 20 moves through the lower part of its path of movement. Preferably, however, the topping device is as hereinafter described with reference to FIGS. 9–12. The final carrier 7,7 is provided by upper horizontal spaced runs of two wire loops extending about a group of pulleys, comprising the abovementioned pulley 8 (FIG. 2) and two pulleys 51,52 mounted on a frame 53. The carrier 7,7 extends through the topping station 54 at the junction of an end of the frame 53 with a support 55. At the back of the support 55 a double-acting hydraulic cylinder 56 is mounted by a pivot 57 at its lower end. The cylinder plunger 58 extends upwards and is pivotally connected to a crank arm 59 on the rear end of the previously mentioned spindle 21 (FIG. 4) which extends forwardly from a vertical front wall 55a of the support 55 and is rotatable in a bearing 60 on the back of the wall 55a. As previously explained with reference to FIG. 4, the spindle 21 projects horizontally above the centre of the carrier 7,7 and carries a dependent sweeper blade 20. The blade 20 is rectangular and of such dimensions that, in the now described device, by oscillating the spindle 21 on its axis, the blade 20 will be caused to sweep to-and-fro above and just clear of the carrier 7,7. On the front of the wall 55a are mounted two cutter blades 19a,19b which are fast on the wall and vertical, each having a vertical cutting edge opposite to and spaced from the other cutting edge, such that the crown 66a of a carrott 66 carried by the carrier 7,7 will pass between the cutting edges.

Figures 9, 10, 11:
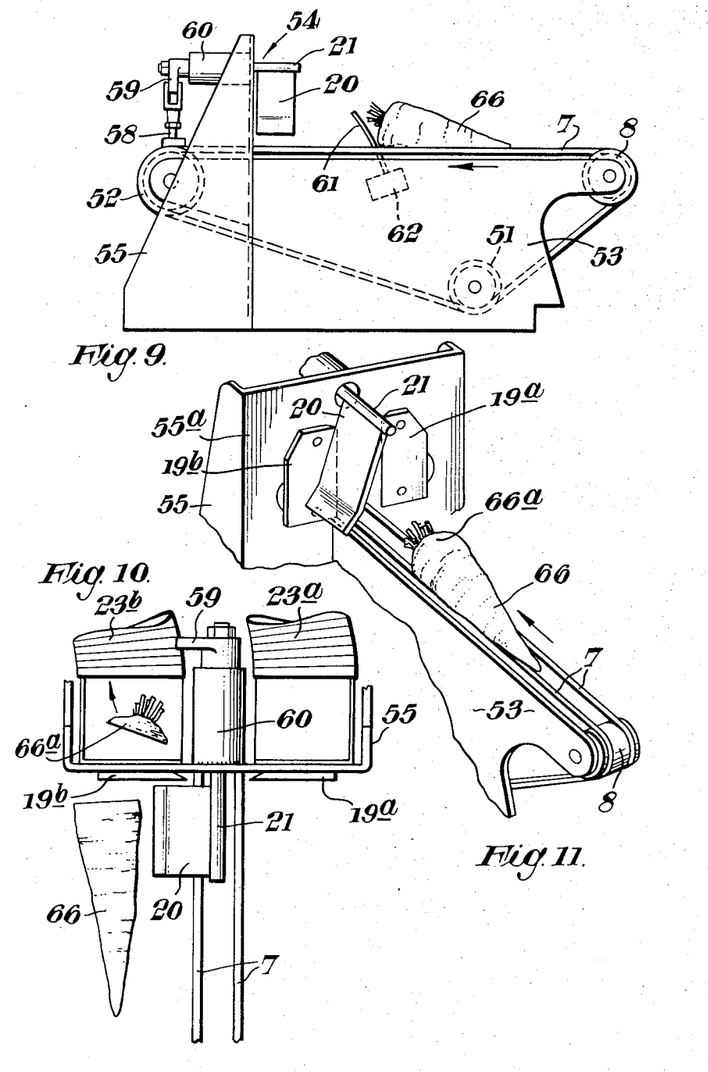
FIG. 9 is a side elevation of the delivery end of the apparatus represented in FIG. 4.
FIG. 10 is a plan of part of a topping device which is indicated in FIG. 9.
FIG. 11 is a perspective view from the front of part of the apparatus shown in FIG. 9.
Figure 12:
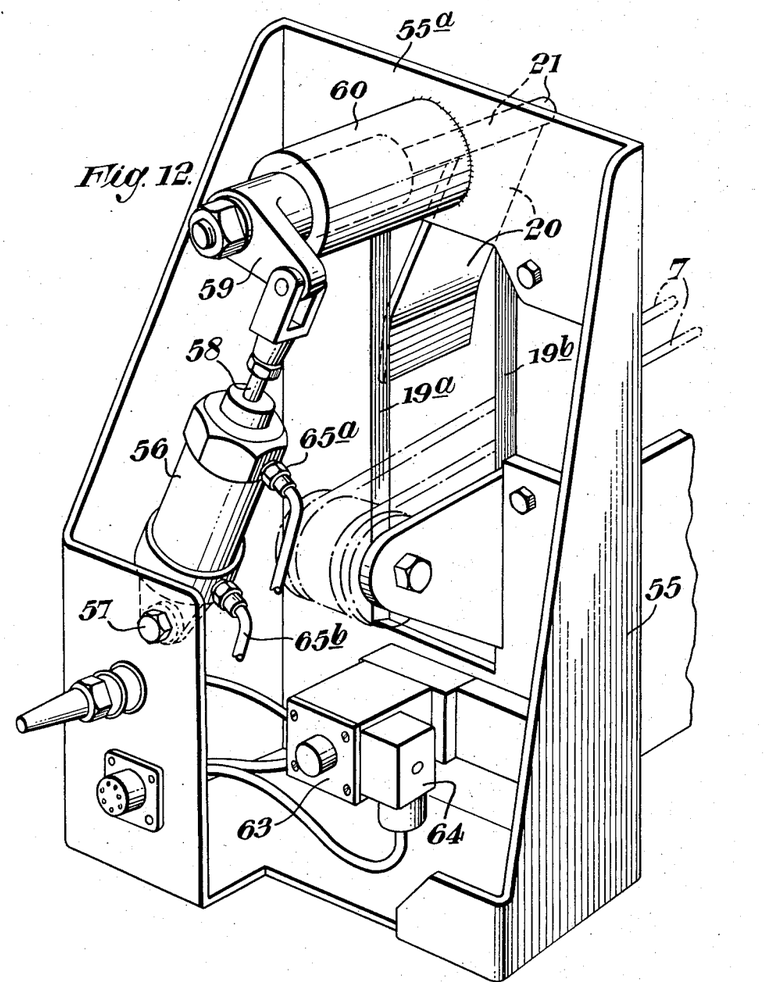
FIG. 12 is an enlarged perspective view from the rear of part of the topping device.

Projecting upwards between the carrier members 7,7 on the approach side of the cutter blades 19a,19b is a flexible trigger 61 for a micro-switch 62. The switch 62 is connected to an electric control unit 64 for a two-state valve 63 which determines the sense in which the cylinder 56 is connected at ports 65a,65b to a pressure fluid source. The arrangement is such that as a carrot 66 approaches the cutter blades 19a,19b, it operates the switch 62 and reverses the fluid supply to the cylinder 56, so that the plunger 58 is driven in one sense to sweep the blade 20 across the carrier 7,7 as the carrot 66 arrives at a position in which the crown has just passed between the blades. Referring to FIG. 10, the sweeper blade 20 sweeps the carrot 66 sideways off the carrier 7,7 and across the blade 19b, whereby the crown 66a is sliced off. The main body 66 of the carrot falls to an appropriate receiver, e.g., the conveyor 22 in FIG. 4, and the crown 66a is drawn away through a suction tube 25b.

When the next carrot approaching the cutters 19a, 19b actuates the switch 62, the valve 63 is operated to cause the plunger 58 to be driven in the opposite sense, so that the sweeper blade 20 sweeps back across the carrier 7,7, displacing this next carrot therefrom, so that its crown is sliced off by the other blade 19a and is drawn away through another suction pipe 23a.

We claim:

1. A multi-level machine for operating upon tapered vegetables and similarly shaped articles, to deliver the articles, from a common hopper, in more than one stream, with the articles aligned in single file with their larger ends leading, the multi-level machine comprising a. more than one multi-unit array mounted one above another at correspondingly more than one level, the units being side-by-side in each multi-unit array, and each unit being a marshalling apparatus comprising a carrier consisting of a part of the paths of two endless carrier members which in said part extend linearly side-by-side in a delivery path from a receiving end to a delivery end of the carrier, the carrier members being divergent from the receiving end and being deflected away from one another by guide pulleys at the delivery end, a longitudinally vibratory receiver trough extending in the delivery direction below, spaced from and forwardly of the carrier, the receiver trough serving below the carrier as a retarder to turn forwardly each of said articles supported by and between the carrier members and the receiving trough serving to receive from the carrier, at or upstream from the delivery end of the carrier, articles with their larger ends leading, a vibratory feed trough having one end positon above the receiving end of the carrier to deliver to the carrier articles aligned in single file in the delivery direction, carrier driving means to drive the carrier members continuously in the delivery direction, and driving means to vibrate the feed trough to feed articles to the carrier and to vibrate the receiver trough to feed articles thereon away from the delivery end of the carrier, b. a hopper at a feeding end of the machine to receive a bulk supply of the articles, c. an elevator including a table extending upwardly from said hopper and inclined forwardly towards the multi-unit arrays, an endless chain-driven conveyor extending between upper and lower sprocket-pulley systems and having spaced horizontal slats extending between, and fastened to, two endless driving chains to be carried thereby in succession upwards through the hopper and across the table to discharge said articles over the top of the table, d. in said table at least one opening and a shutter displaceable to open and close the opening, and e. discharge control means to direct articles discharged over the top of the table to the feed troughs of the topmost multi-unit array and articles discharged through said opening to the feed troughs of another of the multi-unit arrays.

2. A multi-level machine as claimed in claim 1, in which the or each shutter is biased closed, a cam is operatively coupled with the or each shutter to open the shutter, and the cam is coupled to the conveyor to be driven in synchronism therewith.

* * * * *